United States Patent [19]

Hayakawa

[11] Patent Number: 5,042,029
[45] Date of Patent: Aug. 20, 1991

[54] CONGESTION CONTROL METHOD AND APPARATUS FOR END-TO-END PACKET COMMUNICATION

[75] Inventor: Fumiyasu Hayakawa, Tokyo, Japan

[73] Assignee: NEC Corporation, Tokyo, Japan

[21] Appl. No.: 313,267

[22] Filed: Feb. 21, 1989

[30] Foreign Application Priority Data

| Feb. 19, 1988 | [JP] | Japan | 63-36864 |
| Feb. 19, 1988 | [JP] | Japan | 63-36867 |
| Feb. 22, 1988 | [JP] | Japan | 63-39851 |

[51] Int. Cl.$^5$ .................. H04Q 11/04; H04J 3/24
[52] U.S. Cl. ................ 370/60; 370/94.1; 370/13
[58] Field of Search .......... 370/13, 60, 60.1, 94.1, 370/94.2, 94.3, 85.6; 340/825.5, 825.51

[56] References Cited

U.S. PATENT DOCUMENTS

| 4,527,267 | 7/1985 | Cohen | 370/94.1 |
| 4,799,215 | 1/1989 | Suzuki | 370/60 |
| 4,942,569 | 7/1990 | Maeno | 370/60 |

Primary Examiner—Douglas W. Olms
Assistant Examiner—Wellington Chin
Attorney, Agent, or Firm—Sughrue, Mion, Zinn, Macpeak & Seas

[57] ABSTRACT

In a packet switched communications system wherein each destination data terminal sends an acknowledgment packet signalling correct receipt of packets from a source terminal, a congestion detector is provided for detecting a traffic congestion in the system to enable a packet detector. The packet detector, when enabled, detects the receipt of an acknowledgment packet from the destination terminal and stores this packet in a buffer for a specified period of time. The stored packet is then forwarded toward the source terminal upon termination of the specified time period.

36 Claims, 8 Drawing Sheets

CONGESTION CONTROL METHOD AND APPARATUS FOR END-TO-END PACKET COMMUNICATION

BACKGROUND OF THE INVENTION

The present invention relates generally to packet communications systems, and more particularly to a congestion control method and apparatus for end-to-end packet communications.

In the past, such functions as error control and flow control between two communicating data terminal equipments are performed by switching nodes of a packet switched network. However, the recent tendency is toward allocating such control functions to data terminal equipments to perform end-to-end flow control and limiting the functions of the switched network only to data transfer to simplify protocols so that high speed packet transmission can be implemented for application to broadband ISDN (Integrated Services Digital Network). While this type of communication allows high speed exchanging of packets, difficulty will arise because of the end-to-end flow control mode to effect congestion control to prevent the system from becoming abnormally congested to an unmanageable level. To overcome this problem, two proposals have previously been made, one is to impose restrictions on the granting of permission to newly arising call connect requests from terminals and the other is to introduce a service class priority system by entering a priority indication to every packet and discard those packets having lower priority as discussed in a paper titled "Flow and Congestion Control for ISDN New Packet Mode Networks" by T. Y. Choi et al., submitted to the IEEE COMSOC International Workshop on Future Prospects of Burst/Packetized Multimedia Communications, Nov. 22–24, 1987, Osaka, Japan.

However, the proposed call restriction method has no restrictive effect on terminals which have already begun exchanging packets, and thus it takes a substantial amount of time before noticeable effect actually results. The proposed priority system is, on the other hand, likely to result in an additional transient increase in traffic due to possible end-to-end retransmission of packets before connection is cleared by timeout, and packetized speech and video signals tend to degrade in quality because no packet is returned for acknowledging correct receipt of these signals.

SUMMARY OF THE INVENTION

It is therefore an object of the present invention to provide a congestion control method and apparatus for an end-to-end packet flow-controlled communication system to permit it to recover from a congestion in a short period of time without discarding packets or without imposing call restriction.

According to a first aspect of the present invention, there is provided a congestion control method for an end-to-end packet switched communications system in which packets are sent from a source terminal in response to an acknowledgment packet from a destination terminal signalling correct receipt of previous packets from the source terminal. The method comprises the steps of (a) detecting if a traffic congestion occurs in the system and (b) introducing a delay between receipt of an acknowledgment packet by the system from the destination terminal and subsequent transmission of the acknowledgment packet from the system to a). Due to the introduction of a delay before the acknowledgment packet is subsequently sent from the system to the source terminal, the amount of traffic carried by the system can be reduced in a short period of time and the system is prevented from becoming abnormally congested.

Congestion control can be precisely achieved by detecting the level of the traffic congestion and controlling the amount of the delay with the detected level of the traffic congestion. Alternatively, the priority of each acknowledging packet is detected to control the amount of the delay. In a further preferred form of the invention, the amount of delay is controlled more precisely in accordance with both of the detected level of traffic congestion and the detected priority.

The introduction of the delay can be implemented by holding the acknowledgement packet in a buffer or recirculating it through a queue formed in the buffer.

According to a second aspect of the present invention, there is provided a congestion control apparatus in a packet switched communications system which serves a plurality of data terminal equipments each sending an acknowledgment packet from a destination side of the system signalling correct receipt of packets from a source side of the system. The apparatus comprises a congestion detector for detecting a traffic congestion in the system, a packet detector operable in response to the detection of a traffic congestion by the congestion detector for detecting receipt of an acknowledgment packet from a destination data terminal equipment. A delay circuit is provided for holding the detected acknowledgment packet for a period of time and forwarding it toward a source data terminal equipment upon termination of the period of time.

BRIEF DESCRIPTION OF THE DRAWINGS

The present invention will be described in further detail with reference to the accompanying drawings, in which.

DETAILED DESCRIPTION

Figure 1:
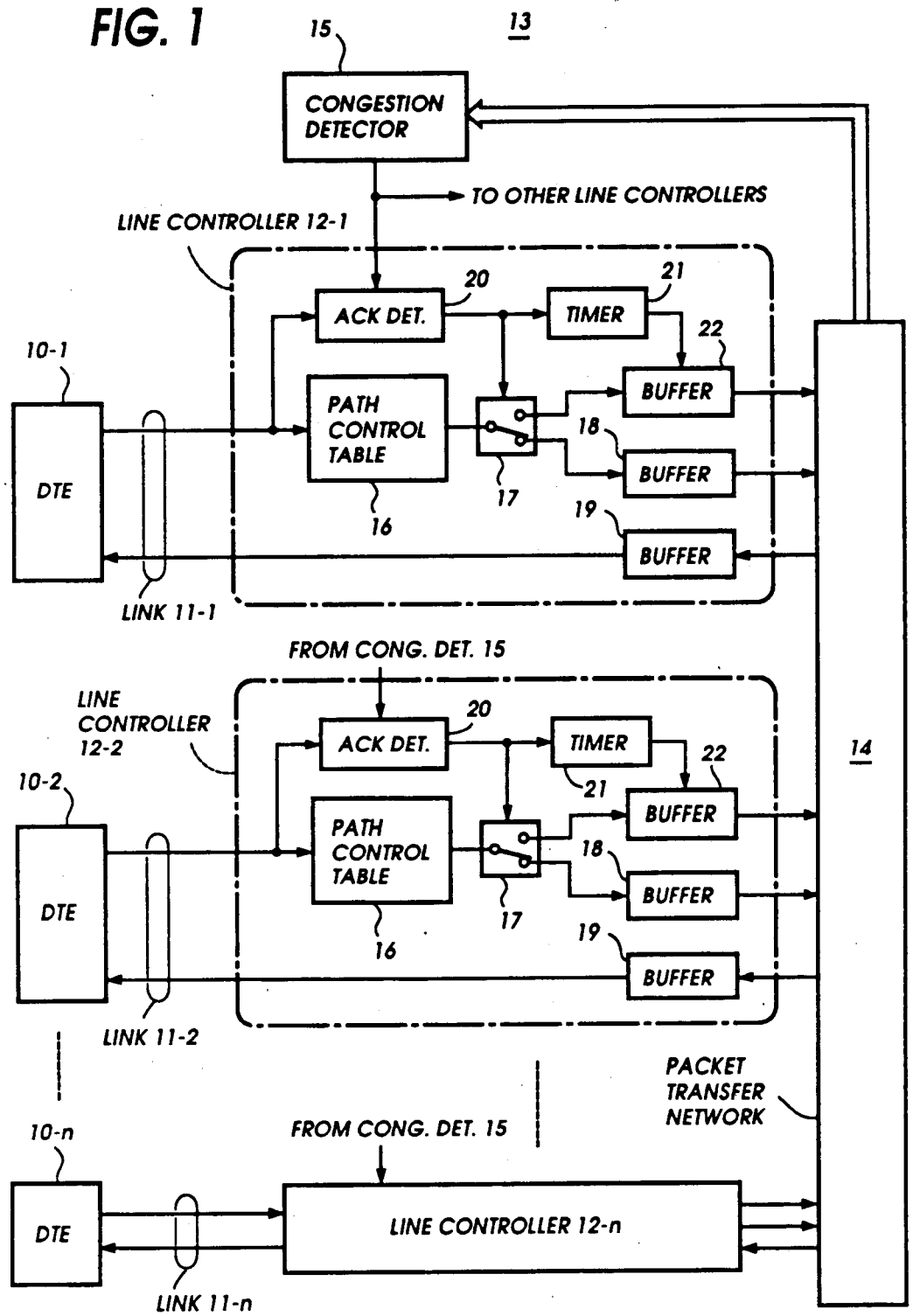
FIG. 1 is a block diagram of a packet switched communication system according to an embodiment of the present invention.

Referring now to FIG. 1, there is shown a packet switched communications system according to a first embodiment of the present invention. The communications system comprises a plurality of data terminal equipments 10-1 through 10-n. Each data terminal equipment employs the so-called "window mechanism" to transmit a consecutive series of packets determined by the window size to any destination terminal and transmit a consecutive series of successive packets also determined by the window size in response to receipt of an acknowledgment packet from a destination terminal signalling correct receipt of previous packets. Therefore, outstanding packets awaiting receipt of acknowledgment are always limited to a constant number determined by the window size.

Data terminal equipments 10-1 through 10-n are connected by way of transmission links 11-1 to 11-n to the line terminals of associated line controllers 12-1 to 12-n of a packet switching system 13. Line controllers 12-1 to 12-n are connected to a packet transfer network 14 by which packets are exchanged between the line controllers. A congestion detector 15 is connected to the network 14 to detect when the traffic volume of the network 14 exceeds a predefined threshold level. Such a congestion detector is known in the art which, in a typical example, detects the traffic volume by measuring the amount of packets processed during a unit interval of time or measuring the storage levels of buffers in the system. When this threshold is exceeded, the congestion detector 15 supplies an output signal to all of the line controllers to impose restriction on the flow of packets in a manner to be described. Line controllers 12 are identically constructed. For purposes of simplicity, line controllers 12-1 and 12-2 are shown in detail. Each line controller includes a path control table 16 to which incoming packets from the associated data terminal equipment 10 are supplied. Path control table 16 translates the routing information such as an address or logical channel number contained in the incoming packets into a form which can be interpreted by the network 14 to transfer the packets to an intended destination controller in a manner as described in a paper titled "Very High Speed and High Capacity Packet Switching for Broadband ISDN" by Hiroshi Suzuki et al., submitted to the ICC '86 in Toronto S24.3, June 24, 1986. Under normal traffic conditions, the translated routing information as well as message signals contained in the incoming packets are passed through a switch 17 to a receive buffer 18 and then forwarded to the packet transfer network 14 at appropriate timing. The packets are switched by the network 14 according to the translated routing information to a transmit buffer 19 of a destination line controller and forwarded at appropriate timing to the associated destination data terminal equipment 10.

According to the present invention, each line controller further includes an acknowledgment detector 20, a timer 21 and a second receive buffer 22. Acknowledgment detector 20 is enabled by the output of congestion detector 15 to detect an acknowledgment packet from the associated DTE signalling correct receipt of a packet from the system. On detecting an acknowledgment packet, the acknowledgment detector 20 produces an output pulse which activates the timer 21 to start measuring the elapse of time and at the same time causes the switch 17 to briefly transfer its moving contact so that the acknowledgment packet is switched to the receive buffer 22. After switching the acknowledgment packet to receive buffer 22, the switch 17 is returned to the normal position to couple the output of path control table 16 to the receive buffer 18. When the measured time length reaches a preset value, the timer 21 supplies an enable pulse to receive buffer 22 to forward the stored acknowledgment packet to the network 14.

Therefore, if a connection is established from source DTE 10-1 to destination DTE 10-2 to exchange packets, message packets from DTE 10-1 are passed through receive buffer 18 of line controller 12-1 and directed to the transmit buffer 19 of destination line controller 12-2. Correct receipt of these message packets by DTE 10-2 is acknowledged by an acknowledgment packet. The latter is normally stored into the receive buffer 18 of line controller 12-2 and forwarded with no substantial delay to the network 14 and then to the transmit buffer 19 of the source line controller 12-1. On receiving this acknowledgment packet, the source terminal 10-1 transmits the next message packet if BSC protocol is adopted between DTEs 10-1 and 10-2. If normal traffic conditions prevail, message and acknowledgment packets are exchanged in this way at a normal rate. When traffic congestion occurs in the system, an acknowledgment packet from DTE 10-2 is stored into the receive buffer 22 of line controller 12-2. After a substantial amount of delay introduced by the timer 21 of line controller 12-2, the acknowledgment packet in the buffer 22 of controller 12-2 is forwarded to the network 14 and directed to the transmit buffer 19 of line controller 12-1 and then forwarded to DTE 10-1 at appropriate timing. On receiving this acknowledgment packet, next message packet is sent from the source DTE 10-1. Thus, during a traffic congestion, message and acknowledgment packets are exchanged at a rate much lower than the normal rate. As a result, the total amount of traffic carried by the system per unit period of time can be reduced significantly before the system traffic will increase to an unmanageable level.

Figure 2:
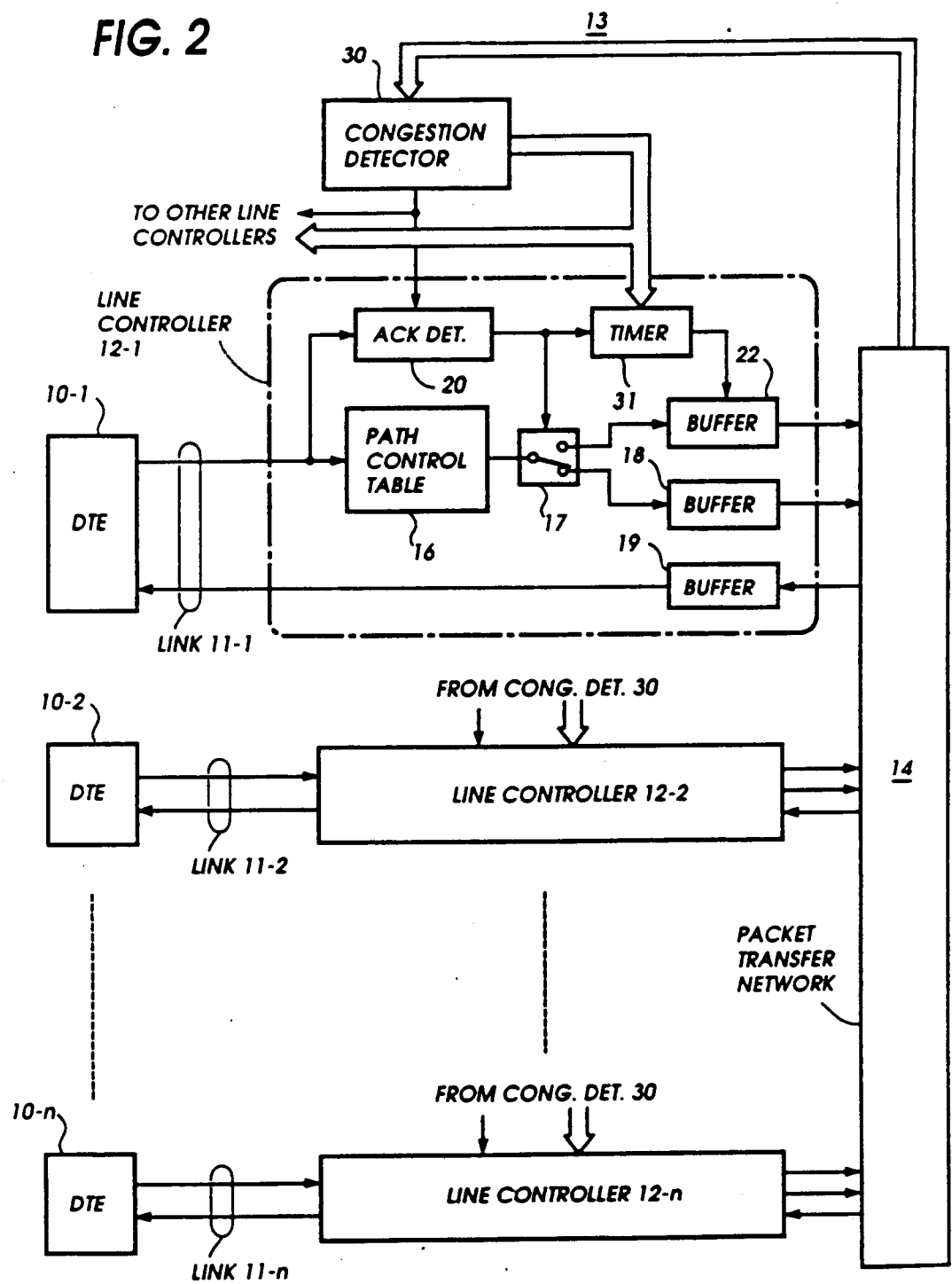
FIG. 2 is a block diagram of a packet switched communication system according to another modification of the present invention in which the delay time is controlled in response to a detected level of congestion.

A modified embodiment of the present invention is shown in FIG. 2 in which parts corresponding to those in FIG. 1 are marked with the same numerals as used in FIG. 1. This modification includes a congestion detector 30 which generates a signal indicating the level of traffic congestion as well as the congestion indicating signal. The congestion level indicating signal is applied to a programmable timer 31 of each line controller 12 to preset it according to the detected level of traffic congestion. Programmable timer 31 of each line controller is activated by its acknowledgment detector 20 as in the previous embodiment to start measuring the amount of time and produce an output when the programmed preset value is reached. An acknowledgment packet from a destination DTE is stored into the receive buffer 22 of the destination line controller in response to the output of its acknowledgment detector 20 and forwarded to the network 14 after a delay determined by the preset value of its programmable timer 31. Through the transfer network 14 the delayed acknowledgment packet is switched to the transmit buffer 19 of the source line controller and thence to the source DTE. Therefore, the rate at which message and acknowledgment packets is exchanged can be variably controlled depending on the level of congestion.

Figure 3:
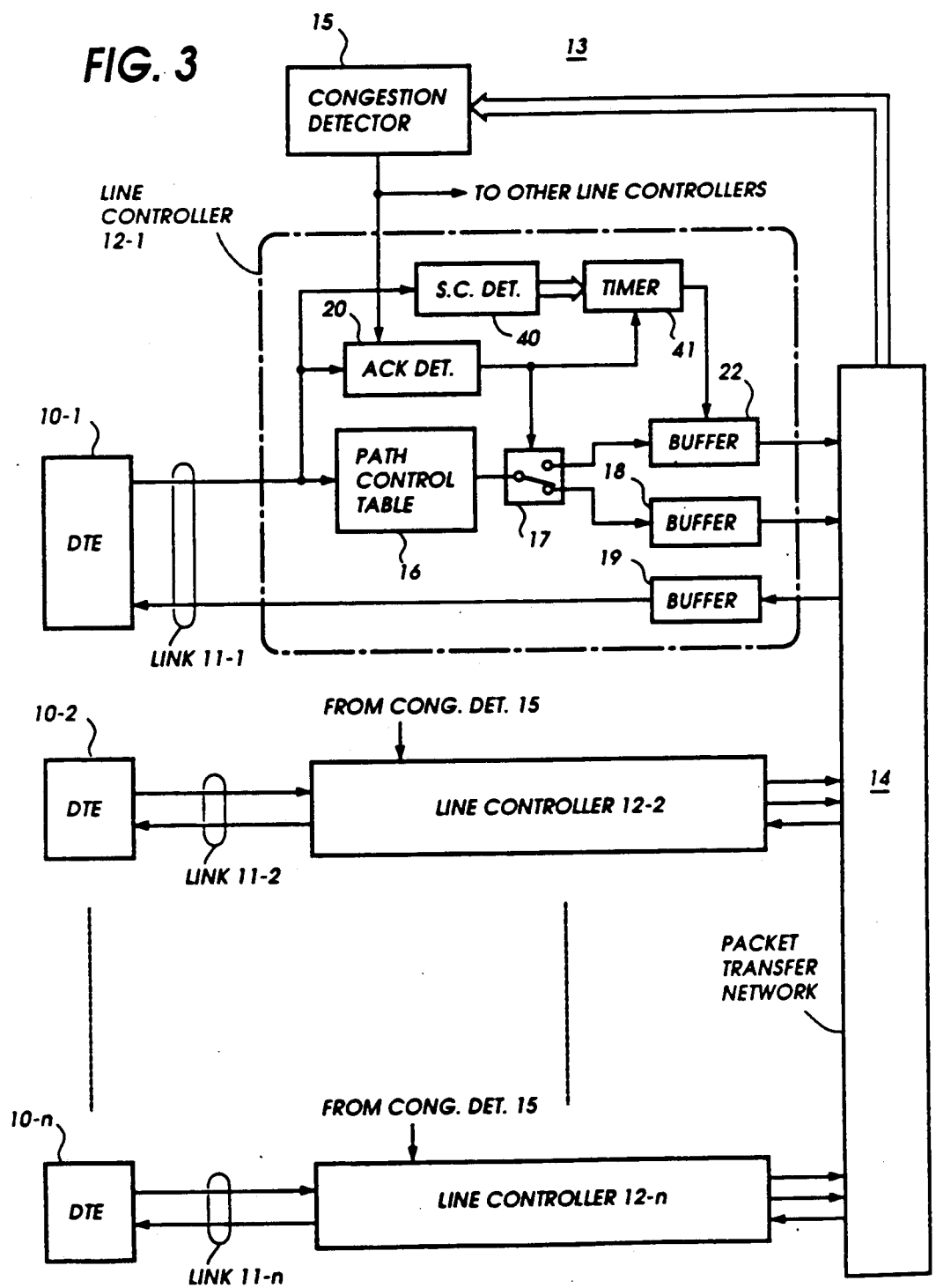
FIG. 3 is a block diagram of a packet switched communication system according to a further modification of the present invention in which the delay time is controlled in response to a detected level of priority.

A further modification of the present invention is shown in FIG. 3 in which each line controller 12 includes a service class (priority) detector 40 and a programmable timer 41. In this embodiment, each acknowledgment packet sent from a destination terminal contains a service class, or priority indicating field. This field is examined by the service class detector 40 and presets the programmable timer 41 according to the priority of the service class such that the preset value is inversely proportional to the priority level. On detecting an acknowledgment packet during a traffic congestion, acknowledgment detector 20 activates the timer 41 to cause it to be preset in accordance with the output of service class detector 40. On determining the service class of the acknowledgment packet, service class detector 40 presets the timer 41 to a lower value if the priority of the service class is high or preset it to a higher value if that priority is low. The acknowledgment packet is stored into the receive buffer 22 in response to the output of acknowledgment detector 20 and forwarded to the network 14 after a variable amount of delay determined by the programmable timer 41. Therefore, during traffic congestions, acknowledgment packets having a higher-priority service class are held in the switching system 13 for a smaller amount of time than those having a lower-priority service class. In this way, message and acknowledgment packets are exchanged at a slightly higher rate than the normal rate for a connection having a higher priority and at a much lower rate for a lower priority connection.

Figure 4:
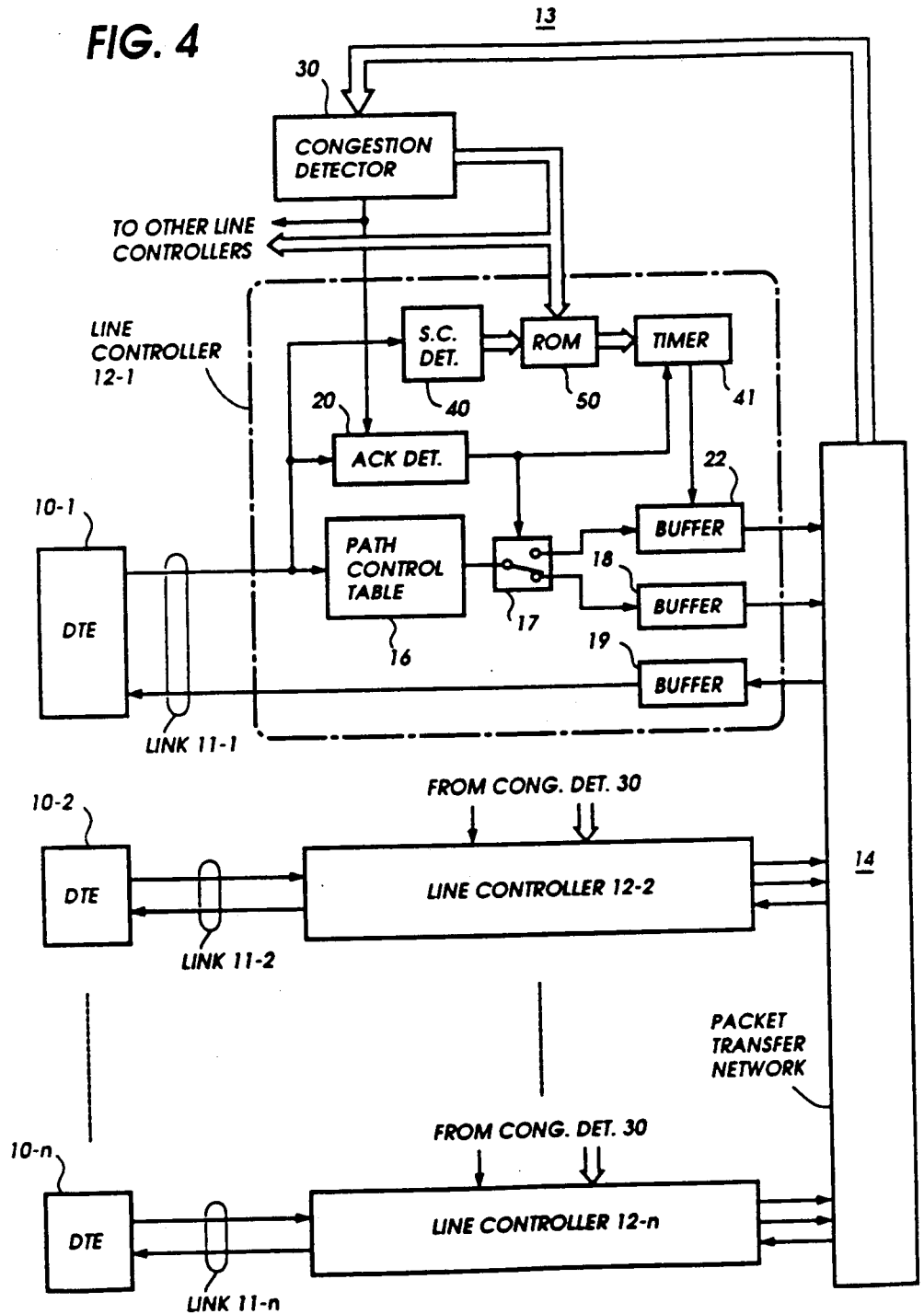
FIG. 4 is a block diagram of a packet switched communication system according to a still further modification of the invention in which the delay time is controlled in response to the detected level of congestion as well as to the detected level of priority.

An embodiment shown in FIG. 4 is a combination of the features of the embodiments of FIGS. 2 and 3. In this embodiment, the output of service class detector 40 and the congestion level indicating output from congestion detector 30 are applied to a read-only memory 50 of each line controller 12. Memory 50 stores time length data which is proportional to the congestion level, but inversely proportional to the priority level of service classes, the stored data being accessed as a function of both service class priority and congestion level and supplied to the programmable timer 41. Thus, the acknowledgment packet is delayed in each line controller by an amount proportional to the level of traffic congestion, but variable inversely as a function of service class.

While mention has been made of embodiments in which congestion control is effected on acknowledgment packets before entering the network 14, it is apparent that the congestion control could equally be effected on acknowledgment packets after leaving the network 14.

Figure 5:
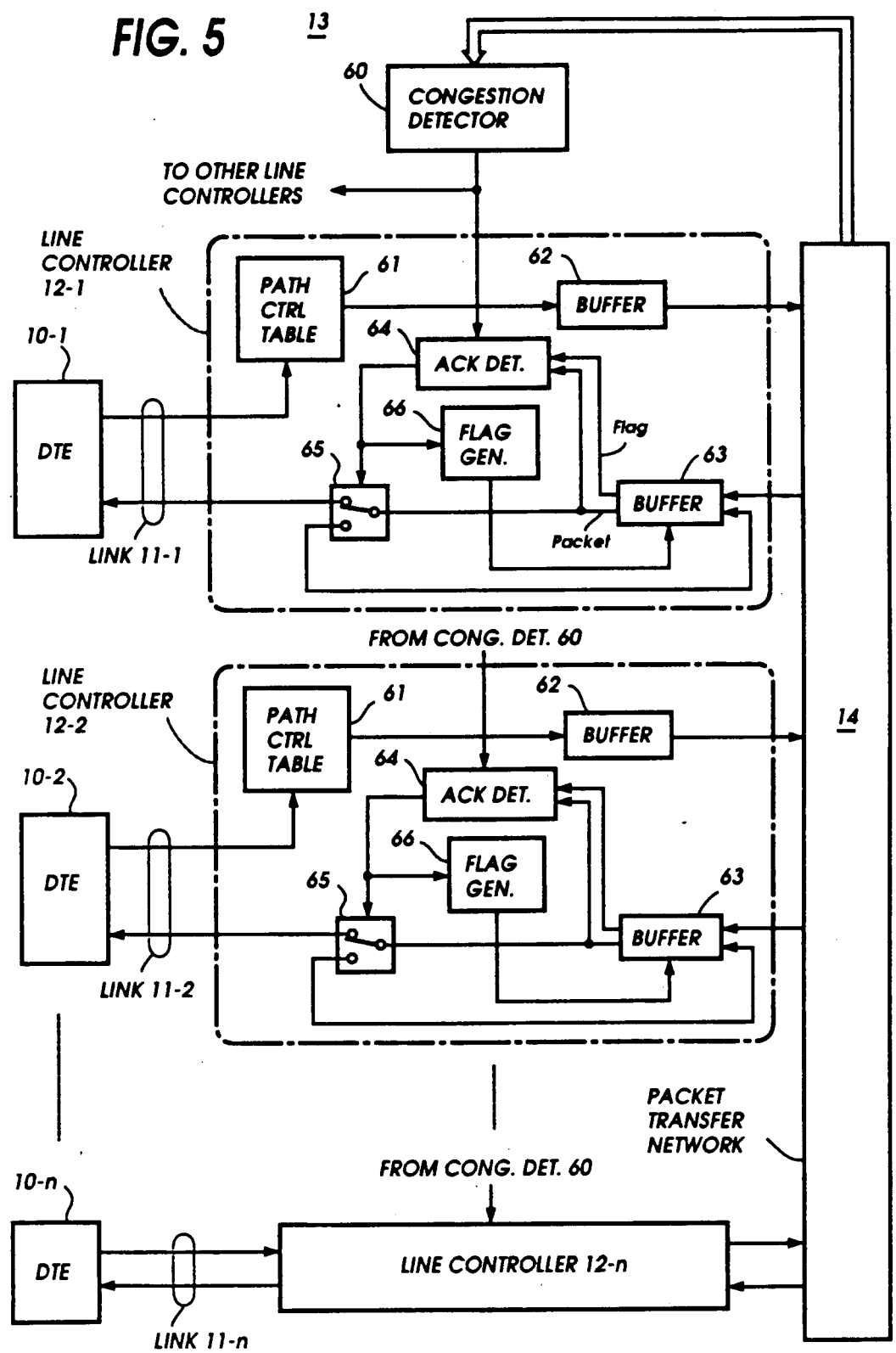
FIG. 5 is a block diagram of a packet switched communication system according to a second embodiment of the present invention in which the delay time is controlled by recirculating acknowledgment packets in a buffer.

FIG. 5 is a further modification of the present invention. In this embodiment, each line controller comprises a path control table 61 and a receive buffer 62 which are connected in series between the associated DTE 10 and the network 14 to translate the routing information of every packet entering the packet switching system 13 and forward it to the network at appropriate timing in a manner identical to that described in the previous embodiments. The packet entering the network 14 is switched to a destination line controller, say 12-2, for example, and enters a transmit buffer 63. In each line controller, the output of transmit buffer 63 is connected to an acknowledgment detector 64 and a switch 65 which normally couples the output of buffer 63 to the associated DTE 10 and switches it to the input of the transmit buffer 63 when a traffic congestion is detected in a manner to be described. A flag generator 66 is connected to the output of acknowledgment detector 64 to generate a binary-0 or binary-1 output respectively in response to a logical-0 or logical-1 output from the acknowledgment detector 64. Every packet entering the transmit buffer 63 has a flag field which is set to "0" or "1" in accordance with the binary level of the output of flag generator 66. Under normal traffic conditions, acknowledgment detector 64 is not activated, producing a logical-0 output and hence the output of flag generator 66 is 0 and the flag field of each packet is thus reset to "0". All packets bearing such a flag bit are passed through the switch 65 and transmitted to the associated DTE 10. When traffic congestion occurs, the acknowledgment detector 64 is activated by a congestion detector 60 to examine every packet leaving the transmit buffer 63 and determine if it is an acknowledgment packet and if the flag field of this packet is set to "0". If these conditions are met, acknowledgment detector 64 supplies a logic-1 output to the flag generator 66 to rewrite the flag field of the leaving packet to "1". The logic-1 output of acknowledgment detector 64 is also applied to the switch 65 to cause it to briefly divert the output of transmit buffer 63 to its input terminal to form a feedback loop. Therefore, an acknowledgment packet leaving the transmit buffer 63 during a traffic congestion bears a flag bit "1" and reenters the transmit buffer 63, waiting a turn to be served at the end of a queue. The output of flag generator 66 now returns to logical-0 level. When this packet is advanced to the top of the queue and leaves the transmit buffer 63 again, the acknowledgment detector 64 produces a logical-0 output to allow it to be passed through the switch 65 for transmission to the associated DTE. Therefore, acknowledgment packets generated during normal traffic conditions experience a delay corresponding to the time it takes to wait once in a queue formed by the transmit buffer 63, while those acknowledgement packets generated during a congestion period experience a delay corresponding to the time it takes to wait twice in the buffer 63. Since the amount of delay introduced by the recirculation process is proportional to the number of packets stored in the transmit buffer 63 at a given instant of time, the time taken for acknowledgment packets to recirculate through the transmit buffer is longer during congestion periods than is taken during normal traffic conditions. Thus, a higher level of congestion control can be automatically imposed on the system traffic with the increasing level of congestion.

If it is desired to introduce a still longer period of delay during congested traffic, it is appropriate to reserve a multibit flag field for each packet and the flag generator 66 is formed of a four-bit pattern generator, for example. The output of acknowledgment detector 64 is usually at logic 0 and switches to logic-1 when it detects an acknowledgment packet bearing flag bits other than all 1's during traffic congestions. In the presence of a logic-0 output from the acknowledgment detector 64, flag generator 66 writes all 0's into the flag field of a packet initially entering the transmit buffer 63 and, in response to a logic-1 output from the acknowledgment detector 64, rewrites a four-bit incremental value into the flag field of the packet just leaving the transmit buffer 63. Until the flag bits of an acknowledgment packet leaving the transmit buffer 63 become the highest value, i.e., all 1's, the acknowledgment detector 64 successively produces a logic-1 output to cause the flag generator 66 to increments the flag of that packet and successively causes the switch 65 to form a feedback loop, so that the acknowledgment packet is recirculated through the transmit buffer 63 sixteen times during heavy traffic periods.

Figure 6:
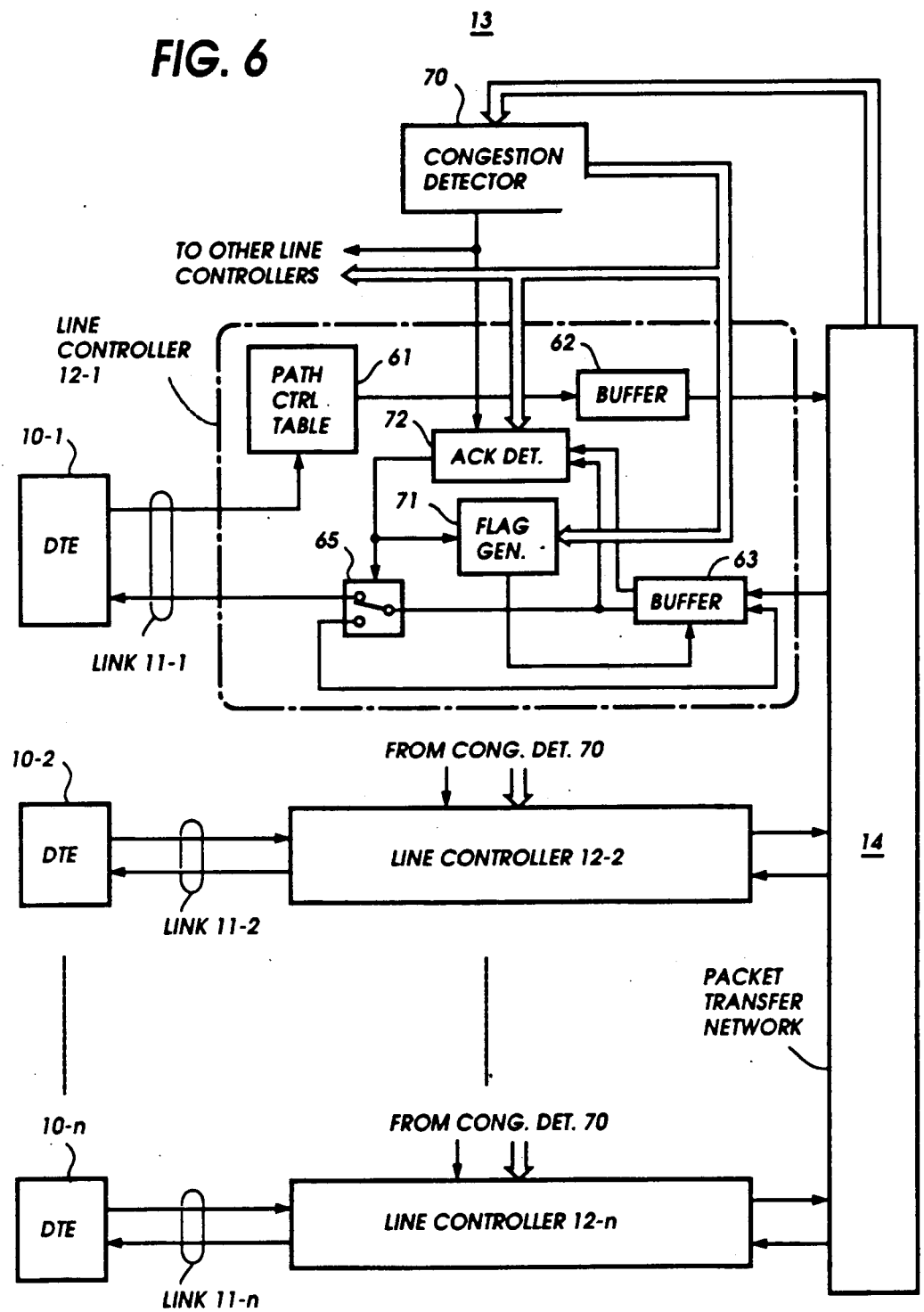
FIG. 6 is a block diagram of a packet switched communication system according to a modification of the FIG. 5 embodiment in which the recirculation is controlled in response to the detected level of congestion.

The highest value of the flag generator 66 can be altered in accordance with a level of congestion signalled from the congestion detector as illustrated in FIG. 6. In this embodiment, the flag generator is indicated by numeral 71 which receives a signal from a congestion detector 70 indicating a level of traffic congestion. The acknowledgment detector, indicated at 72, receives the same signal as applied to the flag generator 71 to modify its highest value which it utilizes to determine when the recirculating acknowledgment packet should be allowed to pass through switch 65 for transmission to the associated DTE. During a highest level of congestion, the flag generator 71 is preset to a highest multibit value to cause acknowledgment packets to recirculate the transmit buffer 63 a higher number of times, while during a lowest level of congestion it is preset to a lowest multibit value to permit them to recirculate through that buffer a fewer times.

Figure 7:
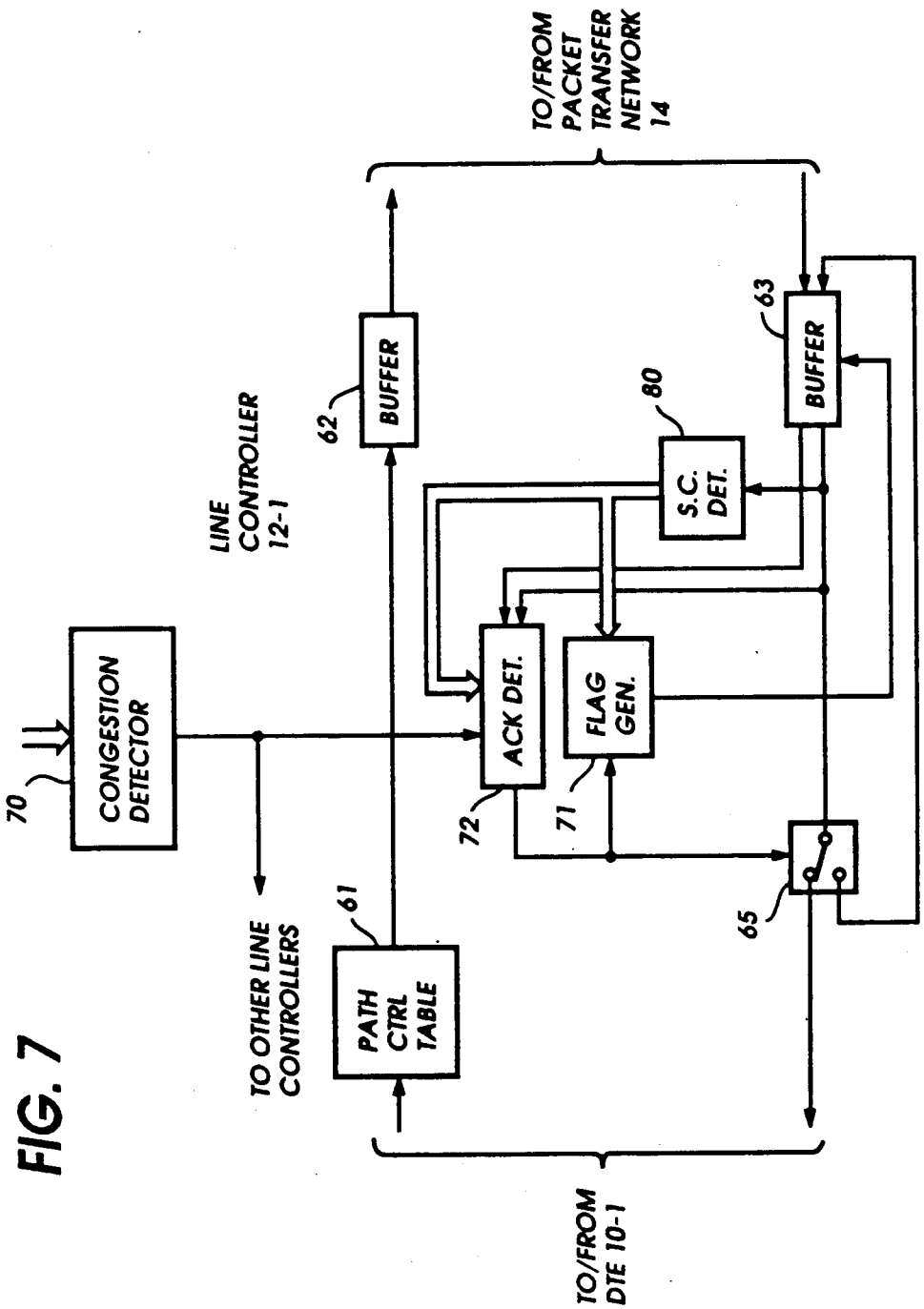
FIG. 7 is a block diagram of a packet switched communication system according to a further modification of the FIG. 5 embodiment in which the recirculation is controlled in response to the detected level of priority.

The highest value of the flag generator 71 can be further altered in relation to the service class of an acknowledgment packet in a manner as shown in FIG. 7. As illustrated, a service class detector 80 is connected to the output of transmit buffer 63 to examine the priority of an acknowledgment packet leaving the transmit buffer. In accordance with the priority of the packet, detector 80 generates a corresponding output signal, which is applied to the flag generator 71 and acknowledgment detector 72 to modify their highest values. The recirculation times of an acknowledgment packet under congestion traffic can therefore be precisely controlled by reducing the recirculating times for higher priority packets and increasing them for lower priority packets.

Figure 8:
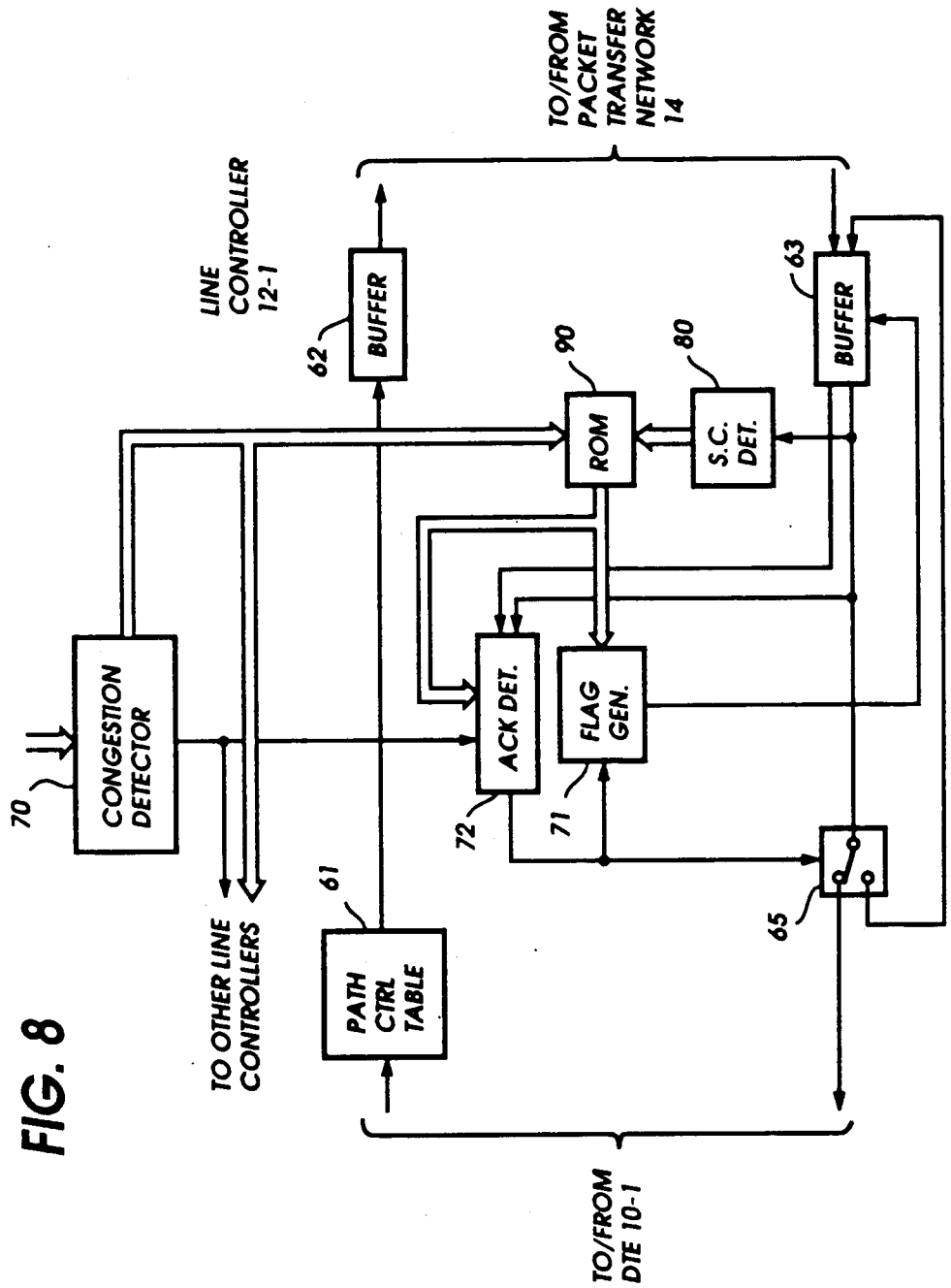
FIG. 8 is a block diagram of a packet switched communication system according to a still further modification of the FIG. 5 embodiment in which the recirculation is controlled in response to the detected level of congestion as well as to the detected level of priority.

As illustrated in FIG. 8, the use of a read-only memory 90 allows the level of congestion as detected by the congestion detector 70 to be advantageously combined with the level of priority as detected by the service class detector 80 to precisely effect the congestion control according to both of these factors.

While mention has been made of congestion control circuitry that is provided at the output of transmit buffer 63, it is apparent that this congestion control circuitry could be equally provided at the output of receive buffer 62, instead of being at the output of buffer 63.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A congestion control method for an end-to-end packet switched communications system including a packet transfer network and a plurality of line controllers coupled to said packet transfer network and associated respectively with data terminals, the data terminals operating as a source terminal for transmitting a message packet and operating as a destination terminal for transmitting an acknowledgment packet signalling correct receipt of previous message packets, said method comprising the steps of (a) detecting if traffic congestion occurs in said packet transfer network; and (b) introducing a delay between receipt of an acknowledgment packet by one of said line controllers associated with one of a destination terminal and a source terminal, and transmission of said acknowledgment packet from the one of said line controllers to the source terminal if traffic congestion is detected by the step (a).

2. A congestion control method as claimed in claim 1, further comprises detecting a level of traffic in said packet transfer network and controlling the amount of said delay as a function of the detected level of traffic so that said delay is proportional to the detected level of traffic.

3. A congestion control method as claimed in claim 1, wherein said acknowledgment packet contains information indicating priority, and wherein said method further comprises detecting the priority of said acknowledgment packet and controlling the amount of said delay with the detected priority.

4. A congestion control method as claimed in claim 1, wherein said acknowledgment packet contains information indicating priority, and wherein said method further comprises detecting a level of traffic in said pocket transfer network, detecting the priority of said acknowledgment packet and controlling the amount of said delay in accordance with both of said detected level of traffic and the detected priority.

5. A congestion control method as claimed in claim 1, wherein the step (b) comprises recirculating said acknowledgment packet through a buffer.

6. A congestion control method as claimed in claim 5, further comprising detecting a level of said traffic congestion and controlling the number of times said acknowledgment packet recirculates through said buffer.

7. A congestion control method as claimed in claim 5, wherein said acknowledgment packet contains information indicating priority, and wherein said method further comprises detecting the priority of said acknowledgment packet and controlling the number of times said acknowledgment packet recirculates through said buffer based on the detected priority.

8. A congestion control method as claimed in claim 5, wherein said acknowledgment packet contains information indicating priority, and wherein said method further comprises detecting a level of traffic in said network, detecting the priority of said acknowledgment packet and controlling the number of times said acknowledgment packet recirculates through said buffer based on both the detected level of traffic and the detected priority.

9. A congestion control apparatus in a packet switched communications system which serves a plurality of data terminal equipments each sending an acknowledgment packet from a destination side of said system signalling correct receipt of packets from a source side of said system, comprising:

congestion detector means for detecting a traffic congestion in said system;

packet detector means operable in response to the detection of a traffic congestion by said congestion detector means for detecting receipt of said acknowledgment packet from a destination data terminal equipment; and delay means for holding said detected acknowledgment packet for a period of time and forwarding same toward a source data terminal equipment upon termination of said period of time.

10. A congestion control apparatus as claimed in claim 9, wherein said congestion detector means generates a signal indicating a level of said traffic congestion and wherein said delay means holds said acknowledgment packet for a variable length of time in accordance with said level indicating signal.

11. A congestion control apparatus as claimed in claim 9, wherein said acknowledgment packet contains information indicating priority, and wherein said apparatus further comprises means for detecting the priority of said acknowledgment packet and wherein said delay means holds said acknowledgment packet for a variable length of time in accordance with the detected priority.

12. A congestion control apparatus as claimed in claim 9, wherein said acknowledgment packet contains information indicating priority, and wherein said apparatus further comprises means for detecting the priority of said detected acknowledgment packet, wherein said congestion detector means generates a signal indicating a level of said traffic congestion and wherein said delay means holds said acknowledgment packet for a variable length of time in accordance with both of said level indicating signal and the detected priority.

13. A congestion control apparatus as claimed in claim 9, wherein said delay means comprises a timer for measuring the length of time in response to the detection of said acknowledgment packet by said packet detector means and generating an output signal when said measured length of time reaches a predetermined value, and a buffer for storing said detected acknowledgment packet therein and forwarding the stored acknowledgment packet to said source data terminal equipment in response to said output signal from said timer.

14. A congestion control apparatus as claimed in claim 13, wherein said congestion detector means generates a signal indicating a level of said traffic congestion and wherein said timer is preset to a prescribed value according to said level indicating signal for generating said output signal.

15. A congestion control apparatus as claimed in claim 13, wherein said acknowledgment packet contains information indicating priority, wherein said apparatus further comprises means for detecting the priority of said detected acknowledgment packet, and wherein said timer is preset to a prescribed value according to the detected priority for generating said output signal.

16. A congestion control apparatus as claimed in claim 13, wherein said acknowledgment packet contains information indicating priority, and wherein said apparatus further comprises means for detecting the priority of said detected acknowledgment packet and wherein said congestion detector means generates a signal indicating a level of said traffic congestion, and said timer is preset to a prescribed value according to both of said level indicating signal and the detected priority for generating said output signal.

17. A congestion control apparatus as claimed in claim 9, wherein said delay means comprises a buffer for storing therein message packets, acknowledgment packets not detected by said packet detector means and said detected acknowledgment packet, and means for recirculating said detected acknowledgment packet through said buffer and forwarding the recirculated acknowledgment packet, the acknowledgment packets not detected by said packet detector means and said message packets toward said source data terminal equipment.

18. A congestion control apparatus as claimed in claim 17, wherein said congestion detector means generates a signal indicating a level of said detected congestion, and wherein said recirculating means causes said acknowledgment packet to recirculate through said buffer a number of times depending on the level of congestion indicated by said signal.

19. A congestion control apparatus as claimed in claim 17, wherein said acknowledgment packet contains information indicating priority, and wherein said apparatus further comprises means for detecting the priority of said acknowledgment packet and wherein said recirculating means causes said acknowledgment packet to recirculate through said buffer a number of times depending on the detected priority.

20. A congestion control apparatus as claimed in claim 18, wherein said acknowledgment packet contain information indicating priority, and wherein said apparatus further comprises means for detecting the priority of said acknowledgment packet, and wherein said recirculating means causes said acknowledgement packet to recirculate through said buffer a number of times depending on both of said level of congestion and said priority.

21. A congestion control apparatus as claimed in claim 17, wherein said packet detector means is connected to the output of said buffer to detect if a flag is contained in said acknowledgment packet and generate a first output signal if said flag is not detected or a second output signal if said flag is detected in said acknowledgment packet and wherein, said recirculating means comprises:
   a flag generator for writing said flag into each acknowledgment packet leaving said buffer in response to said first output signal from said packet detector means; and
   switch means for feeding said acknowledgment packet from said buffer back to an input terminal thereof in response to said first output signal from said packet detector means and forwarding said acknowledgment packet from said buffer toward said source data terminal equipment in response to said second output signal from said packet detector means.

22. A congestion control apparatus as claimed in claim 17, wherein said packet detector means is connected to the output of said buffer to examine the value of a flag in said acknowledgment packet and generate a first output signal if said flag is of a least value or a second output signal if said flag is of a highest value, said recirculating means comprising:
   a flag generator for incrementing the value of said flag in each acknowledgment packet leaving said buffer in response to said first output signal from said packet detector means; and
   switch means for feeding said acknowledgment packet from said buffer back to an input terminal thereof in response to said first output signal from said packet detector means and forwarding said acknowledgment packet from said buffer toward said source data terminal equipment in response to said second output signal from said packet detector means.

23. A packet switching system for serving a plurality of data terminal equipments, each of said data terminal equipments sending an acknowledgment packet from a destination side of said system signalling correct receipt of packets from a source side of said system, comprising:
- a packet switching network;
- congestion detector means for detecting a traffic congestion in said system; and
- a plurality of line controllers associated respectively with said data terminal equipments through transmission links and connected to said packet switching network, each of said line controllers comprising:
  - packet detector means operable in response to the detection of a traffic congestion by said congestion detector means for detecting receipt of said acknowledgment packet from a destination data terminal equipment; and
  - delay means for holding said detected acknowledgment packet for a period of time in said line controller and forwarding same toward a source data terminal equipment upon termination of said period of time.

24. A packet switching system as claimed in claim 23, wherein said congestion detector means generates a signal indicating a level of said traffic congestion and wherein said delay means holds said acknowledgment packet for a variable length of time in accordance with said level indicating signal.

25. A packet switching system as claimed in claim 23, wherein said acknowledgment packet contains information indicating priority, wherein said system further comprises means for detecting the priority of said acknowledgment packet, and wherein said delay means holds said acknowledgment packet for a variable length of time in accordance with the detected priority.

26. A packet switching system as claimed in claim 23, wherein said acknowledgment packet contain information indicating priority, wherein said system further comprises means for detecting the priority of said detected acknowledgment packet, wherein said congestion detector means generates a signal indicating a level of said traffic congestion, and wherein said delay means holds said acknowledgment packet for a variable length of time in accordance with both of said level indicating signal and the detected priority.

27. A packet switching system as claimed in claim 23, wherein said delay means comprises a timer for measuring the length of time in response to the detection of said acknowledgment packet by said packet detector means and generating an output signal when said measured length of time reaches a predetermined value, and a buffer for storing said detected acknowledgment packet therein and forwarding the stored acknowledgment packet to said source data terminal equipment in response to said output signal from said timer.

28. A packet switching system as claimed in claim 27, wherein said congestion detector means generates a signal indicating a level of said traffic congestion and wherein said timer is preset to a prescribed value according to said level indicating signal for generating said output signal.

29. A packet switching system as claimed in claim 27, wherein said acknowledgment packet contains information indicating priority, wherein said system further comprises means for detecting the priority of said detected acknowledgment packet, and wherein said timer is preset to a prescribed value according to the detected priority for generating said output signal.

30. A packet switching system as claimed in claim 27, wherein said acknowledgment packet contains information indicating priority, wherein said system further comprises means for detecting the priority of said detected acknowledgment packet, wherein said congestion detector means generates a signal indicating a level of said traffic congestion, and wherein said timer is preset to a prescribed value according to both of said level indicating signal and the detected priority for generating said output signal.

31. A packet switching system as claimed in claim 23, wherein said delay means comprises a buffer for storing therein message packets, acknowledgment packets not detected by said packet detector means and said detected acknowledgment packet, and means for recirculating said detected acknowledgment packet through said buffer and forwarding the recirculated acknowledgment packet, the acknowledgment packets not detected by said packet detector means and said message packets toward said source data terminal equipment.

32. A packet switching system as claimed in claim 31, wherein said congestion detector means generates a signal indicating a level of said detected congestion, and wherein said recirculating means causes said acknowledgment packet to recirculate through said buffer a number of times depending on the level of congestion indicated by said signal.

33. A packet switching system as claimed in claim 31, wherein said acknowledgment packet contains information indicating priority, wherein said system further comprises means for detecting the priority of said acknowledgment packet, and wherein said recirculating means causes said acknowledgment packet to recirculate through said buffer a number of times depending on the detected priority.

34. A packet switching system as claimed in claim 32, wherein said acknowledgment packet contains information indicating priority, wherein said system further comprises means for detecting the priority of said acknowledgment packet, and wherein said recirculating means causes said acknowledgment packet to recirculate through said buffer a number of times depending on both of said level of congestion and said priority.

35. A packet switching system as claimed in claim 31, wherein said packet detector means is connected to the output of said buffer to detect if a flag is contained in said acknowledgment packet and generate a first output signal if said flag is not detected or a second output signal if said flag is detected in said acknowledgment packet and wherein, said recirculating means comprises:
- a flag generator for writing said flag into each acknowledgment packet leaving said buffer in response to said first output signal from said packet detector means; and
- switch means for feeding said acknowledgment packet from said buffer back to an input terminal thereof in response to said first output signal from said packet detector means and forwarding said acknowledgment packet from said buffer toward said source data terminal equipment in response to said second output signal from said packet detector means.

36. A packet switching system as claimed in claim 31, wherein said packet detector means is connected to the output of said buffer to examine the value of a flag in said acknowledgment packet and generate a first output signal if said flag is of a least value or a second output signal if said flag is of a highest value and wherein, said recirculating means comprises:

a flag generator for incrementing the value of said flag in each acknowledgment packet leaving said buffer in response to said first output signal from said packet detector means; and switch means for feeding said acknowledgment packet from said buffer back to an input terminal thereof in response to said first output signal from said packet detector means and forwarding said acknowledgment packet from said buffer toward said source data terminal equipment in response to said second output signal from said packet detector means.

* * * * *